Sept. 8, 1925.

S. D. TRUMBO

ANIMAL TRAP

Filed Oct. 28, 1924

1,553,012

INVENTOR.
STACY D. TRUMBO
BY
*Shigley & Harney*
ATTORNEYS

Patented Sept. 8, 1925.

1,553,012

UNITED STATES PATENT OFFICE.

STACY D. TRUMBO, OF COLUMBUS, OHIO, ASSIGNOR TO ADAM E. KRAUSS AND CLARENCE M. SHIGLEY, BOTH OF COLUMBUS, OHIO.

ANIMAL TRAP.

Application filed October 28, 1924. Serial No. 746,390.

*To all whom it may concern:*

Be it known that I, STACY D. TRUMBO, a citizen of the United States of America, residing at Columbus, in the county of Franklin and State of Ohio, have invented certain new and useful Improvements in Animal Traps, of which the following is a specification.

My present invention relates generally to animal traps, and is more particularly a rat and mouse trap of the self-set and ever-set type for the trapping and destruction of animals.

Among its many objects my invention aims to provide a trap which will be simple, cheap and effective, which will entirely avoid delicate or complicated moving parts to clog or get out of order, which may be easily cleaned and removed from place to place, which is strong, durable and convenient in use, and in which the destroyed rodents may be easily and quickly discharged from the trap after they are caught.

With the above generally in mind, the further objects as well as the resulting advantages of my invention will be readily appreciated from the following description in which reference is made to the accompanying drawing, forming a part of this specification and wherein—

Referring now to these figures my invention proposes a trap having an outer upwardly opening and preferably cylindrical casing 10 which may in practice resemble in form that of the usual refuse or garbage can, having a base 11 and so constructed as to form in its lower part a water receptacle, the casing having upon its inner surface at circumferentially spaced points above the water chamber inwardly projecting lugs 12 forming supports for a cylindrical bait and trap holder generally indicated at 13 and adapted to be telescopically within the upper portion of the casing.

Figure 1:
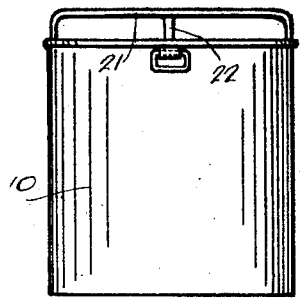
Figure 1 is a side view showing the complete trap.
Figure 2:
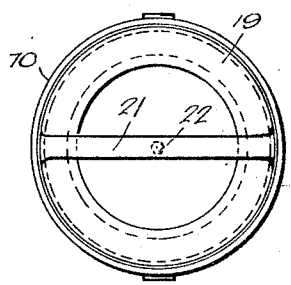
Figure 2 is a top plan view thereof.
Figure 3:
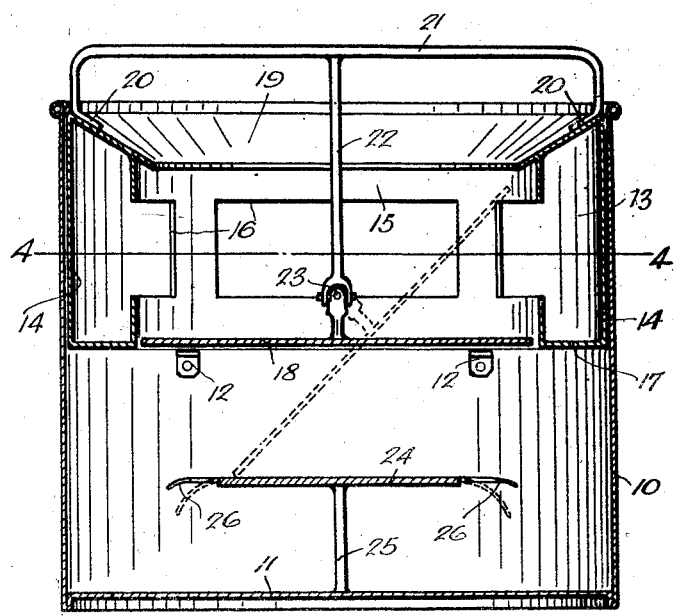
Figure 3 is an enlarged central vertical section.
Figure 4:
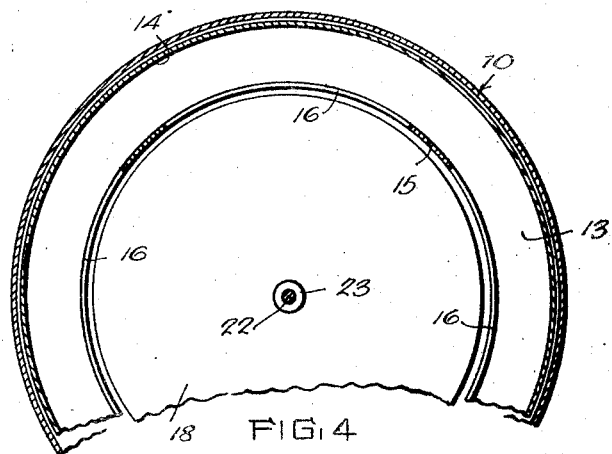
Figure 4 is a partial horizontal section taken on line 4—4 of Figure 3.

The bait and trap holder has an outer cylindrical wall 14 and an inner cylindrical wall 15 spaced therefrom to provide an annular bait holding chamber access to which is had through the enlarged openings 16 in the inner wall 15 as plainly seen in Figures 3 and 4. These inner and outer walls are connected at their lower edges by a base ring 17 which closes the bottom of the bait holding chamber, leaving the central space or well within the inner wall 15 entirely free at its lower portion to receive a trap door 18 in the form of a circular disc of slightly less diameter than the diameter of the above mentioned central well or space.

The top of the bait holding chamber is closed by a top ring 19 whose inner edge projects inwardly beyond the inner wall 15 as plainly seen in Figure 3. This top ring may be flat or it may be inwardly and downwardly inclined as shown, and it forms, at diametrically opposite points, supports for the angular ends 20 of a cross bail or handle 21 which is rigid by virtue of the brazing, soldering or other firm connections of the angular ends 20 in place.

The cross bail 21 thus forms a handle whereby the bait and trap holder 13 as a unit may be positioned within and lifted from the trap casing 10 and also forms a support for the upper end of a trap door holding rod 22 securely fastened at its upper end to the cross bail and depending axially within the central well or space of the trap and bait holder. To the lower end of the pendent rod 22, the trap door 18 is axially connected by virtue of a universal joint at 23 so that it is thus obvious the trap door is capable of universally tilting movement and being free to yield in a tilting manner in any direction when an animal drops thereon, all danger of jamming is avoided and the animal is instantly thrown off balance to such an extent as to prevent the same from recovering and climbing the trap door to safety.

In operation suitably attractive bait is placed within the annular bait holding chamber between the walls 14 and 15 and although it is quite possible that some at least of the animals attracted by the odor of the bait may jump into the bait holding compartment, it is contemplated that they cannot climb out of the trap in view of the inwardly overhanging lip formed by the inner edge of the top ring 19 as previously described.

It is also contemplated in use that the casing 10 will have its lower portion filled with water so that the animals precipitated into the casing by the trap door will be drowned and in this way avoid the danger of removing them alive. It is not, however, necessary that water be supplied within the casing and the animals drowned, but in the event that the casing is used dry it is preferable that a table 24 be mounted centrally in the base of the casing upon an upright 25, and provided with flexible projecting members 26 around its edge in order to avoid all danger of the animals climbing onto the lowermost edge of the trap door when the latter is tilted downwardly to discharge other animals into the casing.

I claim:

1. An animal trap including an upwardly opening casing forming a water receptacle in its lower portion, a holder within the upper portion of the casing having inner and outer walls defining a central well and a bait compartment around the well, said holder also having a top ring whose inner edge projects into and overhangs the upper end of the well, a trap door in the holder normally extending across the lower portion of the well substantially below the said top ring, and means supporting the said trap door and with which the latter has a universally movable connection at its center adapting the same to universally tilting movement said means also forming a handle for the holder, as described.

2. An animal trap including an upwardly opening casing forming a water receptacle in its lower portion, a holder within the upper portion of the casing having inner and outer walls defining a central well and a bait compartment around the well, said holder also having a top ring whose inner edge projects into and overhangs the upper end of the well, a trap door in the holder normally extending across the lower portion of the well substantially below the said top ring, and means supporting the said trap door and with which the latter has a universally movable connection at its center adapting the same to universally tilting movement, said door supporting means consisting of a suspension member depending through the well and said holder being detachably supported within the casing for ready removal therefrom to permit access to the water space of the casing as described.

3. An animal trap including an upwardly opening casing forming a water receptacle in its lower portion, a holder within the upper portion of the casing having a central well and a bait compartment around the well and also having a top ring whose inner edge projects into the well, a trap door in the holder normally extending across the lower portion of the well, said holder being detachable from the casing and having an upper cross bail forming a handle therefor, and a rod pendent from the center of the bail axially through the well of the holder and with which the said trap door has a universally movable connection at is center.

In testimony whereof I have affixed my my signature.

STACY D. TRUMBO.